United States Patent [19]
Hanson

[11] 3,817,408
[45] June 18, 1974

[54] SILAGE DISTRIBUTION APPARATUS

[75] Inventor: Newell B. Hanson, Lake Lillian, Minn.

[73] Assignee: Hanson Silo Company, Lake Lillian, Minn.

[22] Filed: Dec. 15, 1972

[21] Appl. No.: 315,528

[52] U.S. Cl. .............. 214/17 CB, 239/665, 302/60
[51] Int. Cl. ............................................. B65g 65/32
[58] Field of Search ............... 214/17 CB; 198/128; 302/60; 239/665

[56] References Cited
UNITED STATES PATENTS

| | | | |
|---|---|---|---|
| 2,856,191 | 10/1958 | Kolb | 239/665 X |
| 3,360,140 | 12/1967 | Buschbom | 214/17 CB |
| 3,430,788 | 3/1969 | Edming | 214/17 CB |

*Primary Examiner*—Robert G. Sheridan
*Attorney, Agent, or Firm*—Merchant, Gould, Smith & Edell

[57] ABSTRACT

A frame attached to the discharge end of a silo loading chute and depending therefrom, the frame supporting a normally generally horizontal rotary silage distributor plate underlying the discharge end of the chute, and an angularly positioned deflector plate between the distributor plate and the discharge end of the chute. The deflector plate is positioned so that silage falling from the discharge chute is caused to travel downwardly and radially outwardly with respect to the distributor plate. The deflector plate is adjustably movable in directions to shift the path of silage flowing from the deflector plate radially inwardly or outwardly with respect to the distributor plate.

5 Claims, 3 Drawing Figures

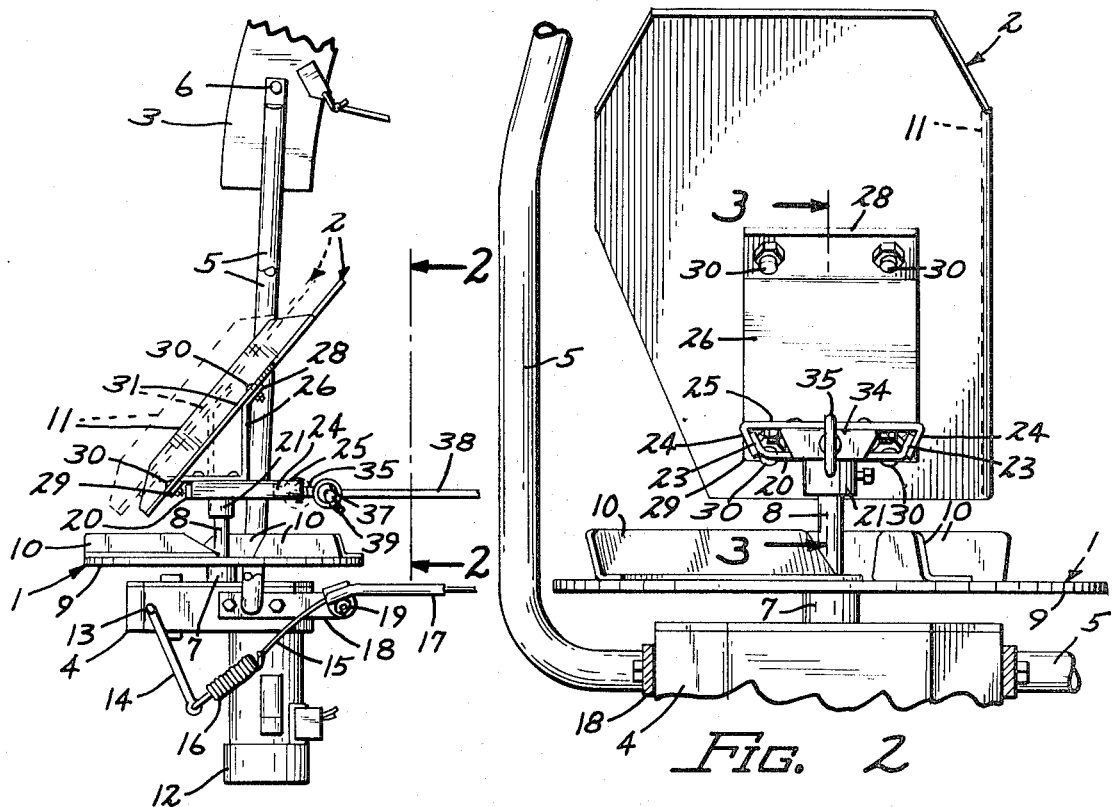
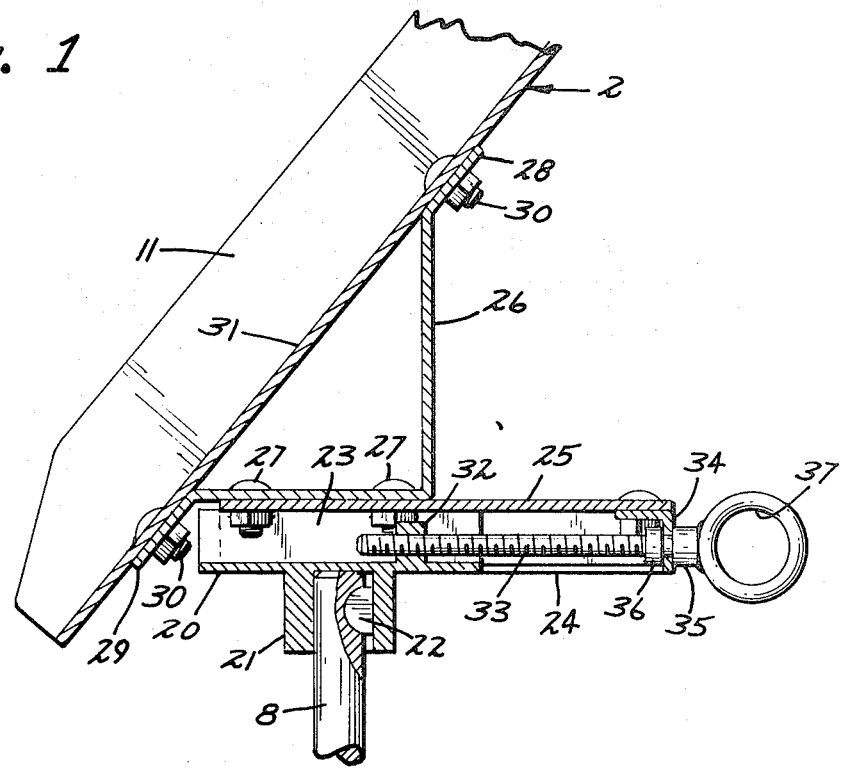

SILAGE DISTRIBUTION APPARATUS

BACKGROUND OF THE INVENTION

1. Field of the Invention

This invention relates to the art of filling storage tanks, such as silos, by the use of commercially available silage blowers which discharge silage downwardly into the silo from the top portion of the silo. A problem connected with such filling is that of uniform distribution of the material over the area within the silo.

2. Description of the Prior Art

Various devices for distributing silage, as it is discharged into a silo, are known, examples of these being found in U.S. Pats. Nos. 3,175,668 and 3,360,140. Some use deflector plates that are changable as to angularity with respect to the direction of flow of silage from a chute, others are fixed. Still others use rotary distributor plates having involved drive mechanism for varying the speed of rotation thereof to change the flow of material, so as to adapt the device for use in silos of different diameters and to vary the pattern of distribution of silage.

SUMMARY OF THE INVENTION

The present invention is in the nature of an improvement on the device of my prior U.S. Letters Patent No. 3,640,409, issued Feb. 8, 1972, and entitled "Silage Distribution Apparatus." The apparatus involves a normally generally horizontally disposed rotary plate-like distributor member supported below the generally downwardly opening discharge end of a silo loading chute by a generally vertical hollow rotary shaft journaled in a gear housing. A second rotary shaft, coaxial with the hollow shaft, has an upper end operatively supporting an angularly disposed plate-like deflector member between the discharge end of the chute and the distributor member. A motor mounted on the gear housing and gearing within the gear housing cooperate to rotate the distributor member at a relatively high rate of speed and the deflector member at a relatively low rate of speed. The improvement involved in this invention consists of apparatus for shifting the deflector plate in a generally horizontal direction or transversely of the axis of rotation of the members in such manner that the flow path of silage from the deflector plate is shifted in a direction generally radially of the distributor member. In this manner, the ratio in quantity of silage falling on the distributor member to that which falls downwardly beyond the peripheral edge of the distributor member, may be changed. The apparatus utilizes a base mounted directly on the low speed rotary shaft, a carriage mounted on the base for linear movements in opposite directions transversely of the shaft and on which the deflector member is mounted, and a screw device for moving the carriage and deflector member relative to the base.

DESCRIPTION OF THE DRAWINGS

FIG. 1 is a fragmentary view in side elevation of a silage distributor incorporating the improvement of this invention;

FIG. 2 is an enlarged fragmentary view in rear elevation, as seen from the line 2—2 of FIG. 1; and FIG. 3 is a further enlarged fragmentary section taken on the line 3—3 of FIG. 2.

DESCRIPTION OF THE PREFERRED EMBODIMENT

A distributor mechanism is shown in the drawings as comprising a horizontally disposed distributor member 1 and an angularly disposed plate-like deflector member 2 overlying the distributor member 1, and underlying the downwardly opening discharge end of a loading chute 3, which may be assumed to be located within the upper end portion of a conventional silo, not shown. The distributor and deflector members 1 and 2 respectively are supported from a gear housing 4 which underlies the distributor member 1 and which is supported from the discharge end portion of the loading chute 3 by a pair of elongated support arms 5 rigidly secured at their lower ends to opposite sides of the gear housing 4 and pivotally secured at their upper ends to the loading chute 3, as indicated at 6. The distributor member 1 is supported on a vertically disposed hollow shaft 7 that extends downwardly therefrom into the gear housing 4, the deflector member 2 being supported, by means hereinafter described, on a rotary shaft 8 coaxial with the shaft 7. The distributor member 1 comprises a flat circular plate 9 and a plurality of upstanding generally radial ribs 10, the deflector member 2 being in the nature of a flat plate-like element and having an upstanding rib or flange 11 along one side edge thereof.

Rotary movement is imparted to the hollow shaft 7 and distributor 1 at relatively high speed, and to the rotary shaft 8 and deflector member 2 at relatively low speed, by means of a drive motor 12 secured to the gear housing 4, and gearing, not shown, but contained within the gear housing 4. Control means for operatively connecting or disconnecting the shaft 8, so that the same will be selectively stationary or rotating, is contained within the gear housing 4 and includes a control shaft 13 journaled in the gear housing 4 and having a radially projecting crank arm 14 at one end thereof exterior of the gear housing 4. A control cable 15 has one end connected to the radially outer end of the crank arm 14 by means of a coil tension spring 16, the cable 15 extending through a hollow rigid rod 17 having its inner end pivotally connected to a bracket 18 on the gear housing 4, as indicated at 19. Although not shown, it may be assumed that the hollow rod 17 extends to the wall of the silo adjacent an opening therein and provided with means for holding the apparatus in an operative position below the discharge end of the loading chute 3 as shown. Means, not shown, is provided for moving the rod 17 toward the silo wall to swing the support arms 5 and parts carried thereby about the axes of the pivot connections 6 so that the deflector and distributor members are disposed at one side of the path of material flow through the chute 3. The control cable 15 may be assumed to extend outwardly of the silo so as to be readily accessible to an operator.

The above-described structure is disclosed in detail, and claimed in my above-mentioned prior U.S. Pat. No. 3,640,409. In view of the teaching of this prior patent, further detailed showing and description of the patented structure is believed unnecessary here, and is omitted in the interest of brevity.

The improvement of this invention includes a horizontally disposed base 20 having a depending boss 21 for reception of the upper end of the rotary shaft 8, the boss 21 being fixed to the shaft 8 by means of a key or the like 22, for common rotation therewith. The base 20 includes a pair of laterally spaced upwardly diverging flanges 23 that slidably engage a pair of depending downwardly converging flanges 24 of a horizontally disposed carriage 25 that is slidably mounted on the base 20, the flanges 23 and 24 providing a dovetail connection between the base 20 and carriage 25, see particularly FIG. 2. A generally L-shaped bracket 26 is rigidly secured to the carriage 25 by nut-equipped screws 27, and has angular end portions 28 and 29 that are secured to the deflector member 2 by nut-equipped screws 30, disposing the deflector member 2 in a plane that intersects the axis of the shaft 8 at an oblique angle thereto. The deflector member 2 has a flat upper surface 31 upon which material being delivered to the interior of the silo to the loading chute 3, impinges and flows angularly downwardly and in a direction generally radially outwardly with respect to the distributor member 1. As shown in FIG. 1, the plane of the deflector member surface 31 converges with the distributor member 1 in one direction of movement of the carriage 25.

Means for imparting movements to the carriage 25 selectively in opposite directions with respect to the base 20, and for holding the carriage 25 and parts carried thereby in desired set positions of movement thereof, comprises a nut element 32 welded or otherwise rigidly secured to the base 20, and a cooperating adjustment screw 33 that extends longitudinally of the movement of the carriage 25. The adjustment screw 33 is screw-threadedly received in the nut element 32, and has an outer end portion that is journaled in a bracket member 34 bolted or otherwise rigidly secured to the carriage 25. At its extreme outer end, the adjustment screw 33 is provided with an enlarged head 35 that defines a shoulder which engages one side of the bracket 34. A stop collar or the like 36 is rigidly mounted on the adjustment screw 33 for engagement with the opposite side of the bracket 34, the head 35 and collar 36 holding the adjustment screw 33 against axial movement relative to the carriage 25. The screw head 35 defines an enlarged transverse opening 37 for reception of an adjusting tool such as an elongated rod 38 having an inner hooked end 39, the rod 38 being shown fragmentarily in FIG. 1. While not specifically shown, it may be assumed that the adjustment rod 38 is of sufficient length to enable an operator to reach inwardly to an opening in the silo wall or roof and engage the transverse opening 37 with the hooked inner end 39 and impart rotary movement to the adjustment screw 33.

Positioning of the deflector member 2 radially with respect to the distributor member 1 determines the radial extent to which the silage is thrown in the silo when the distributor member 1 is rotated at a given fixed speed. When the adjustment screw 33 is rotated in a direction to position the deflector member 2 so that all of the silage discharged from the chute 3 falls upon the distributor member 1, the silage will be distributed over an area of maximum diameter. By moving the deflector member 2 radially outwardly with respect to the distributor member 1, or to the left with respect to FIG. 1, some of the silage material will be caused to flow from the deflector member 2 radially outwardly of the marginal edge of the distributor member 1. That portion of the silage material which falls outwardly of the distributor member 1 tends to deter radially outward movement of that portion of the silage material which falls on the distributor member 1. Thus, the diameter of the distributed area of silage material becomes less than that covered by the silage material when all of the same is deposited on the distributor member 1. By moving the deflector member 2 radially outwardly with respect to the distributor member 1 so that none of the material falls on the distributor member 1, an area of substantially minimum diameter of deposited material results. Thus, it can be readily seen that an area of uniform delivery may be quickly and easily varied in diameter to accommodate silos of different diameters without the necessity for changing speeds of rotation of the distributor member, such as by providing expensive variable speed motors or variable speed transmission gearing.

While I have shown and described a preferred embodiment of my novel improvement for silage distribution apparatus, it will be understood that the same is capable of modification without departure from the spirit and scope of the invention, as defined in the claims.

What is claimed is:

1. In a silage distributor comprising; a normally generally horizontally disposed rotary distributor member, means for mounting the distributor member in underlying spaced relationship to the downwardly disposed discharge end of a silo loading chute, means for imparting rotary movement to said distributor member on a generally vertical axis, and a rotary deflector member overlying said distributor member, the improvement comprising:

a. means mounting said deflector member in upwardly spaced relation to said distributor member for rotary movement and for linear movements in opposite directions transversely of the axis of said rotary movement thereof;
   b. and means for imparting said linear movement to said deflector member and for holding said deflector member in desired set positions of said linear movement, whereby to shift the flow path of material discharged from the loading chute generally radially relative to the distributor member and in all positions of rotary movement thereof.

2. The improvement defined in claim 1 in which said means mounting the deflector member comprises a generally vertical rotary shaft coaxial with said distributor member, a base on the upper end of said shaft, a generally horizontal carriage mounted on said base for linear movements relative thereto in a generally horizontal plane, and bracket means mounting said deflector member on said carriage for linear movements therewith.

3. The improvement defined in claim 2 in which said deflector member includes a generally flat plate-like portion disposed at an oblique angle to the axis of said rotary shaft, said plate-like portion sloping toward said distributor member in one of said directions of transverse movement of the carriage.

4. The improvement defined in claim 2 in which said means imparting linear movements to the deflector member comprises an adjustment screw and a cooperating nut element one on said base and one on said carriage, said nut element threadedly receiving said adjustment screw.

5. The improvement defined in claim 4 in which said nut element is fixedly mounted on said base, said adjustment screw being journaled for rotation in said carriage and for said linear movements therewith, said adjustment screw including a head on one end having a portion for engagement with a tool for imparting carriage moving rotation to said adjustment screw.

\* \* \* \* \*